(12) United States Patent
Kanayama et al.

(10) Patent No.: US 12,073,114 B2
(45) Date of Patent: Aug. 27, 2024

(54) STACKED COMMAND QUEUE

(71) Applicant: Advanced Micro Devices, Inc., Santa Clara, CA (US)

(72) Inventors: Hideki Kanayama, San Jose, CA (US); Eric M. Scott, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 133 days.

(21) Appl. No.: 17/491,058

(22) Filed: Sep. 30, 2021

(65) Prior Publication Data
US 2023/0102680 A1   Mar. 30, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0622* (2013.01); *G06F 3/0635* (2013.01); *G06F 3/0679* (2013.01)

(58) Field of Classification Search
CPC .... G06F 3/0604; G06F 3/0622; G06F 3/0635; G06F 3/0659; G06F 3/0679; G06F 3/0656; G06F 13/1605; G06F 13/1642
USPC ............... 710/28, 29, 39; 711/154
See application file for complete search history.

(56) References Cited

U.S. PATENT DOCUMENTS

| | | | | |
|---|---|---|---|---|
| 6,182,177 B1 * | 1/2001 | Harriman | ................ | G06F 13/18 710/39 |
| 6,532,501 B1 * | 3/2003 | McCracken | ........ | G06F 13/1642 710/39 |
| 6,549,991 B1 * | 4/2003 | Huang | ................ | G06F 13/1626 711/158 |
| 8,972,627 B2 * | 3/2015 | Strasser | ................ | G06F 3/0688 710/39 |
| 9,336,163 B2 * | 5/2016 | Fujiwara | ................... | G06T 1/60 |
| 10,268,419 B1 * | 4/2019 | Tylik | ...................... | G06F 3/061 |
| 10,579,303 B1 * | 3/2020 | Li | .......................... | G06F 3/0683 |
| 2007/0162642 A1 * | 7/2007 | Tousek | .................... | G06F 13/28 710/22 |
| 2011/0066770 A1 * | 3/2011 | Muppirala | ............ | G06F 3/0659 710/39 |
| 2015/0012735 A1 * | 1/2015 | Tamir | ...................... | H04L 67/34 713/2 |

(Continued)

OTHER PUBLICATIONS

Y. Yang, S. R. Kuppannagari and V. K. Prasanna, "A High Throughput Parallel Hash Table Accelerator on HBM-enabled FPGAs," 2020 International Conference on Field-Programmable Technology (ICFPT), Maui, HI, USA, 2020, pp. 148-153, doi: 10.1109/ICFPT51103.2020.00028. (Year: 2020).*

*Primary Examiner* — Reginald G Bragdon
*Assistant Examiner* — Aaron D Ho
(74) *Attorney, Agent, or Firm* — Polansky & Associates, P.L.L.C.; Paul J. Polansky; Nathan H. Calvert

(57) ABSTRACT

A memory controller includes a command queue with multiple entry stacks, each with a plurality of entries holding memory access commands, one or more parameter indicators each holding a respective characteristic common to the plurality of entries, and a head indicator designating a current entry for arbitration. An arbiter has a single command input for each entry stack. A command queue loader circuit receives incoming memory access commands and loads entries of respective entry stacks with memory access commands having the respective characteristic of each of the one or more parameter indicators in common.

21 Claims, 7 Drawing Sheets

(56) References Cited

U.S. PATENT DOCUMENTS

| | | | |
|---|---|---|---|
| 2016/0170887 A1* | 6/2016 | Jafri | G06F 12/128 |
| | | | 711/135 |
| 2017/0315914 A1* | 11/2017 | Muralimanohar | G06F 12/0806 |
| 2017/0352403 A1* | 12/2017 | Lee | G11C 14/009 |
| 2018/0018105 A1* | 1/2018 | Magro | G11C 7/1072 |
| 2018/0018291 A1* | 1/2018 | Magro | G06F 13/1689 |
| 2018/0217951 A1* | 8/2018 | Benisty | G06F 13/1642 |
| 2018/0275923 A1* | 9/2018 | Earhart | G06F 3/0604 |
| 2019/0138210 A1* | 5/2019 | Lindholm | G06F 13/1678 |
| 2019/0278515 A1* | 9/2019 | Wells | G06F 3/064 |
| 2021/0011862 A1* | 1/2021 | Chiu | G06F 9/546 |
| 2021/0191650 A1* | 6/2021 | Vansteenkiste | H04L 67/1097 |
| 2021/0192672 A1* | 6/2021 | McCrary | G06F 9/4812 |

\* cited by examiner

STACKED COMMAND QUEUE

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus. Other memory technologies such as High Bandwidth Memory (HBM) modules also have increased transfer rates.

A memory controller is a digital circuit that manages the flows of data going to and from the DRAM over the memory bus. The memory controller receives memory access requests from the host system, stores them in a queue, and dispatches them to the DRAM in an order selected by an arbiter. As time goes on, DRAMs increase in size and include additional features and complexity, making it difficult for DRAM memory controllers to optimize memory access efficiency without causing excessive size and cost and requiring complete re-design of prior memory controllers. Furthermore, as systems increase in complexity, the number of memory clients accessing a memory system tend to increase. This added complexity results in higher performance requirements from memory controllers as they are required to fulfill demands from a variety of clients such as multiple processing cores.

Figure 1:
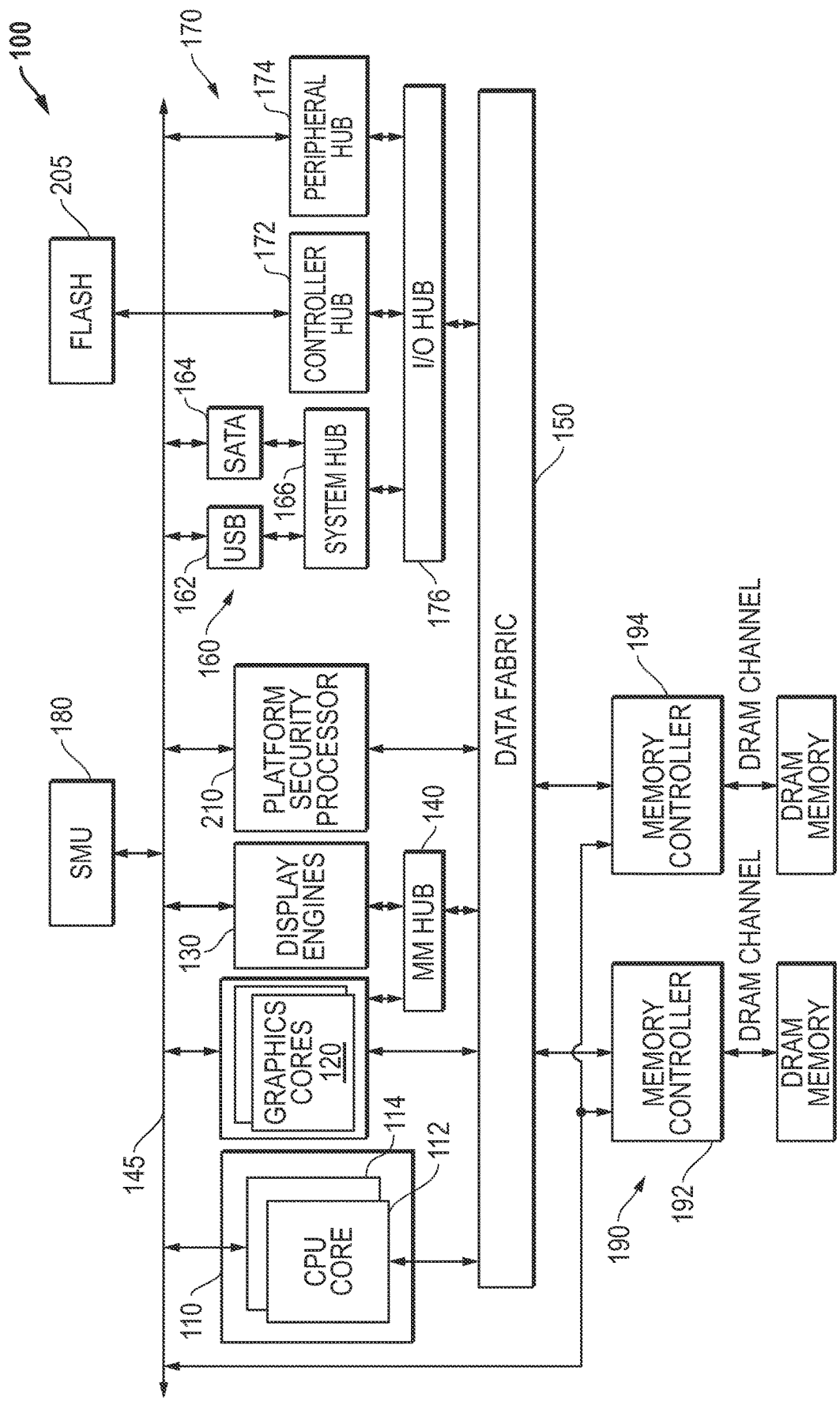
FIG. 1 illustrates in block diagram form an accelerated processing unit (APU) and memory system known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a command queue, an arbiter, and a command queue loader circuit. The command queue includes a plurality of entry stacks, each entry stack including a plurality of entries each for holding memory access commands, one or more parameter indicators each holding a respective characteristic common to the plurality of entries, and a head indicator designating a current entry for arbitration. The arbiter selects memory access commands from the command queue for transmission to a DRAM memory. The arbiter includes a single command input for each entry stack. The command queue loader circuit receives incoming memory access commands and loading entries of respective entry stacks with memory access commands having the respective characteristic of each of the one or more parameter indicators in common.

A data processing system includes a plurality of graphics processing units, a data fabric coupled to the plurality of graphics processing units; and a memory controller coupled to the data fabric for fulfilling memory access requests from the graphics processing units. The memory controller includes a command queue, an arbiter, and a command queue loader circuit. The command queue includes a plurality of entry stacks, each entry stack including a plurality of entries each for holding memory access commands, one or more parameter indicators each holding a respective characteristic common to the plurality of entries, and a head indicator designating a current entry for arbitration. The arbiter selects memory access commands from the command queue for transmission to a DRAM memory. The arbiter includes a single command input for each entry stack. The command queue loader circuit receives incoming memory access commands and loading entries of respective entry stacks with memory access commands having the respective characteristic of each of the one or more parameter indicators in common.

A method for operating a memory controller includes loading multiple memory access commands into each of multiple entry stacks in a command queue. For each respective entry stack, the method designates a current entry for arbitration from among the multiple memory access commands in the respective entry stack. For each respective entry stack, the method presents at least one common characteristic of the multiple memory access commands in the respective entry stack to an arbiter for selecting from among the current entries. At the arbiter, the method includes selecting a current entry from the command queue for dispatch to a memory based at least in part on the common characteristic.

FIG. 1 illustrates in block diagram form an accelerated processing unit (APU) 100 including anti-rollback security features according to some embodiments. APU 100 is implemented as a System-on-Chip (SoC) which may be part of a variety of host data processing platforms. While an APU is shown in this embodiment, other data processing platforms such as a central processing unit (CPU) or a graphics processing unit (GPU) may be used. APU 100 includes generally a CPU core complex 110, a graphics core 120, a set of display engines 130, a memory management hub 140, a data fabric 150, a set of peripheral controllers 160, a set of peripheral bus controllers 170, a system management unit (SMU) 180, a platform security processor (PSP) 210, a flash memory 205, and a set of memory controllers 190.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN) 145, which forms a control fabric, and to data fabric 150, and is capable of providing memory access requests to data fabric 150. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN 145 and to data fabric 150, and is capable of providing memory access requests to data fabric 150. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 130 render and rasterize objects generated by graphics core 120 for display on a monitor. Graphics core 120 and display engines 130 are bidirectionally connected to a common memory management hub 140 for uniform translation into appropriate addresses in memory, and memory management hub 140 is bidirectionally connected to data fabric 150 for generating such memory accesses and receiving read data returned from the memory system.

Data fabric 150 includes a crossbar switch for routing memory access requests and memory responses between any memory accessing agent and memory controllers 190. It also includes a system memory map, defined by basic input/output system (BIOS), for determining destinations of memory accesses based on the system configuration, as well as buffers for each virtual connection.

Peripheral controllers 160 include a USB controller 162 and a serial advanced technology attachment (SATA) interface controller 164, each of which is bidirectionally connected to a system hub 166 and to SMN 145. These two controllers are merely exemplary of peripheral controllers that may be used in APU 100.

Peripheral bus controllers 170 include a system controller hub 172 and a peripheral controller hub 174, each of which is bidirectionally connected to an input/output (I/O) hub 176 and to SMN 145. System controller hub 172 connects to Flash memory 205 over a suitable communications link. I/O hub 176 is also bidirectionally connected to system hub 166 and to data fabric 150. Thus, for example, a CPU core can program registers in USB controller 162, SATA interface controller 164, system controller hub 172, or peripheral controller hub 174 through accesses that data fabric 150 routes through I/O hub 176.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 also manages power for the various processors and other functional blocks.

Platform security processor (PSP) 210 is a local security controller that controls the firmware booting process aboard the APU 100. PSP 210 also performs certain software validation and Firmware Anti-Rollback (FAR) features, as will be further described below.

While a SoC implementation is shown, this is not limiting, and other computing platforms may also benefit from the FAR techniques set forth herein.

Figure 2:
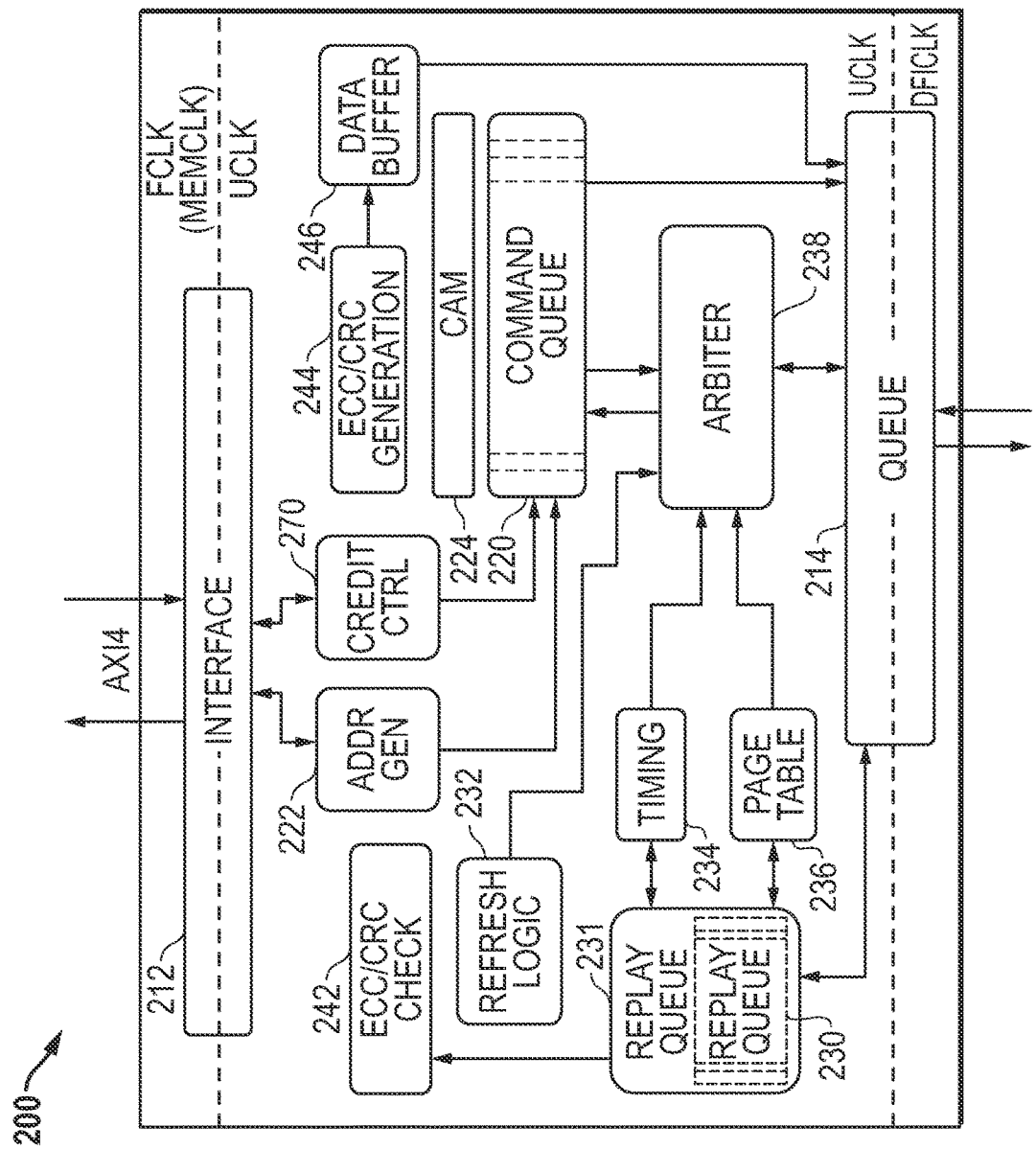
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally an interface 212, a memory interface queue 214, a command queue 220, an address generator 222, a content addressable memory (CAM) 224, replay control logic 231 including a replay queue 230, a refresh control logic block 232, refresh control logic 232, a timing block 234, a page table 236, an arbiter 238, an error correction code (ECC) check circuit 242, an ECC generation block 244, a data buffer 246, and a credit control circuit 270.

Interface 212 has a first bidirectional connection to data fabric over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from the data fabric over the AXI4 bus. The memory access requests include access addresses in the physical address space represented in a normalized format. Address generator 222 converts the normalized addresses into a format that can be used to address the actual memory devices in memory system, as well as to efficiently schedule related accesses. This format includes a region identifier that associates the memory access request with a particular rank, a row address, a column address, a bank address, and a bank group. On startup, the system BIOS queries the memory devices in memory system to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules. Command queue 220 is a stacked command queue including multiple entry stacks each containing multiple command entries, in this embodiment 32 entry stacks of four entries each, as further described below.

Credit control circuit 270 generally manages flow control credits for memory access requests received over interface 212 from data fabric 150 (FIG. 1). Credit control circuit 270 issues and redeems flow control credits to data fabric 150. Because the entries in command queue 220 are stacked, the flow control credits are not issued and redeemed on a one-to-one basis, but instead require certain conditions to be applied when issuing and redeeming flow control credits, as further described below with respect to FIG. 9.

Error correction code (ECC) generation block 244 determines the ECC of write data to be sent to the memory. This ECC data is then added to the write data in data buffer 246. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments as further discussed below. In addition, refresh control logic 232 periodically calibrates ZQ to prevent mismatch in on-die termination resistance due to thermal changes in the system.

Arbiter 238 is bidirectionally connected to command queue 220 and is the heart of memory controller 200, performing intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "tRc". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230. Arbiter 238 includes a single command input for each entry stack of command queue 220, and selects commands therefrom to schedule for dispatch through memory interface queue 214 to the DRAM channel.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Memory controller 200 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers (not shown) store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page.

Figure 3:
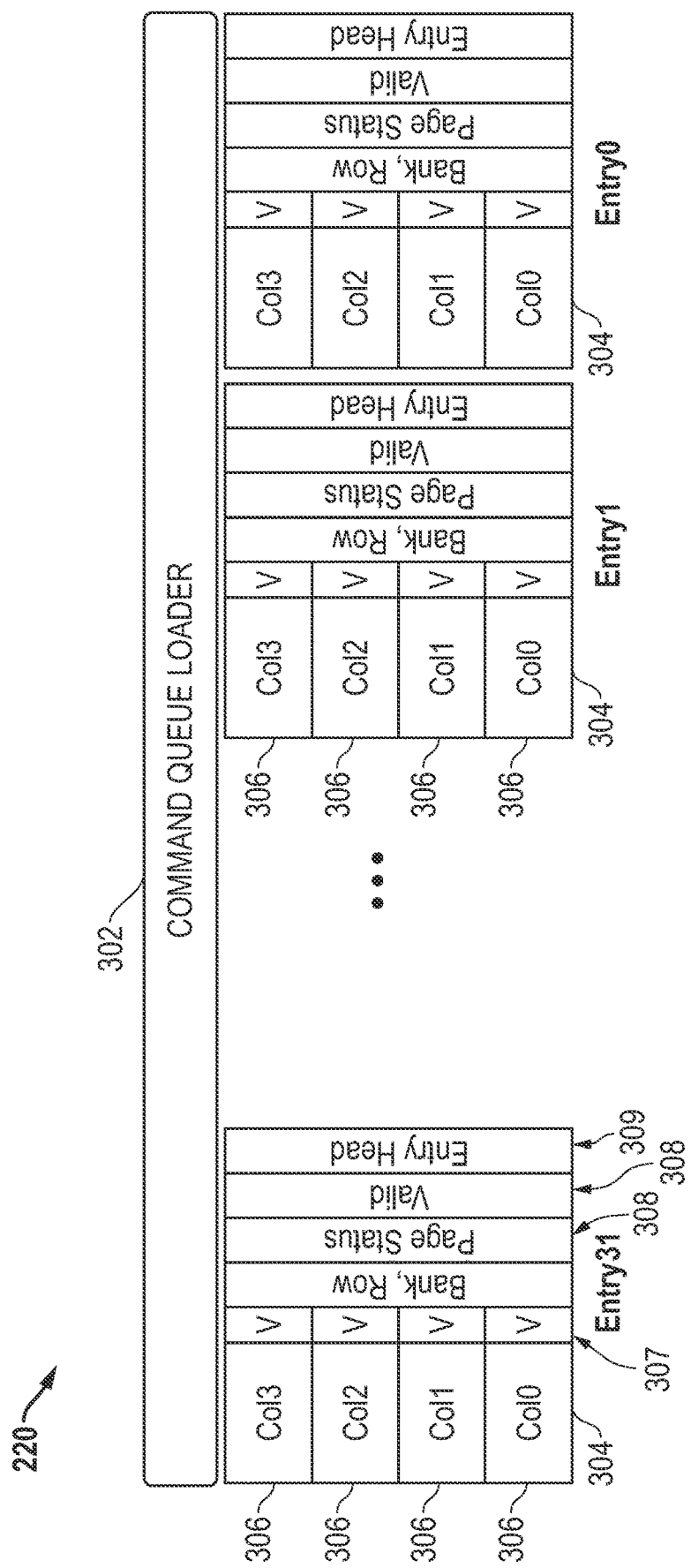
FIG. 3 illustrates in block diagram form an implementation of a command queue according to some embodiments.

FIG. 3 illustrates in block diagram form in implementation of a command queue 220 according to some embodiments. Command queue 220 includes a command queue loader circuit 302 and a number of entry stacks 304.

In the depicted command queue 220, there are 32 entry stacks 304. Each entry stack includes a number of command entries 306 ("entries") for holding individual memory access commands, a validity indicator 307 for each entry, a number of parameter indicators 308 each holding a respective characteristic common to all entries in the respective entry stack 304, and a entry head indicator 309 designating a current entry for arbitration. Each entry stack 304 includes a single command output connected to a respective command input of arbiter 238 (FIG. 2).

In this example, the parameter indicators 308 include a bank and row indicator labeled "Bank, Row", a "Page Status" indicator, and a validity indicator labeled "Valid". The bank and row indicator holds the memory bank number and row address of the commands in entries 306, and may be implemented as two separate indicators or a single indicator including designated bits for the bank number and row address. The Page Status indicator indicates a whether the entries contain commands that are currently page hits, page misses, or page conflicts. Each entry stack also includes an entry head indicator 309 labeled "Entry Head" which designates the current entry for arbitration. While certain parameter indicators 308 are used in the depicted embodiment, other common parameter indicators are suitable for use in various embodiments. For example, a priority indicator may be used to indicate a command priority common to all commands in an entry stack 304. In such case, the highest priority assigned to a command in an entry stack 304 is used for the value of priority indicator. The particular selection of what indicators to use will vary according to the arbitration scheme employed.

The column addresses for each command loaded to an entry 306 are individually saved, as indicated by the labels "Col0", "Col1", "Col2", and "Col3". Each entry 306 one or more bits identifying the request type for the command, for DRAM commands typically read or write, and any associated request size, along with other information such as transaction tags. The validity indicators 307 are preferably a single bit labelled "V" indicating whether a valid command is currently stored in the entry. Stacked requests in the same entry stack 304 are in the same DRAM page, i.e. the same bank, same row.

In operation, command queue loader circuit 302 receives incoming commands from address generator 222, and loads them to entries of respective entry stacks 304 with memory access commands having the respective characteristic or characteristics of each of the one or more parameter indicators in common. A suitable loading process is further described below with respect to FIG. 6. Generally, command queue loader circuit 302 loads incoming commands for which the "Bank, Row" are common to a respective entry stack 304 until the entry stack is full.

Entry head indicator 309 indicates the location of the current request in the entry stack that is referred by arbiter 238 as a candidate. Entry head indicator 309 is adjusted during operation of command queue 220 as commands are selected by the arbiter and retired from command queue 220. Arbiter 239 does not monitor all 4 commands in an entry stack at the same time. Instead, arbiter 239 monitors the command indicated by entry head indicator 309 of each entry stack 304, using only a single command input to arbiter 239 from each entry stack 304. In some embodiments, entry head indicator 309 is a pointer to the currently presented entry for its entry stack. When a new request is stored into an empty entry stack 304, the entry head indicator 309 for the entry stack is reset to refer to the entry 306 at Col0. Once the command at entry Col0 is retired, the validity indicator bit 307 for the Col0 is cleared as the Entry Head is incremented to refer the arbiter to the command at the Col1 entry. This updating process is performed until the end of the stack is retired. Once all entries are retired in an entry stack 304, the validity indicator (typically a single bit), is cleared, and the entry stack 304 presents no command for arbitration until at least one new command is loaded into it.

As it is guaranteed that all commands in an entry stack 304 are directed to a common page and will therefore be a page hit when the entry stack is selected by arbiter 239, the subsequent requests in the entry stack can be issued as a burst of DRAM commands without any timing penalty. This effect is another advantage of the stacked command queue scheme provided herein.

Figure 4:
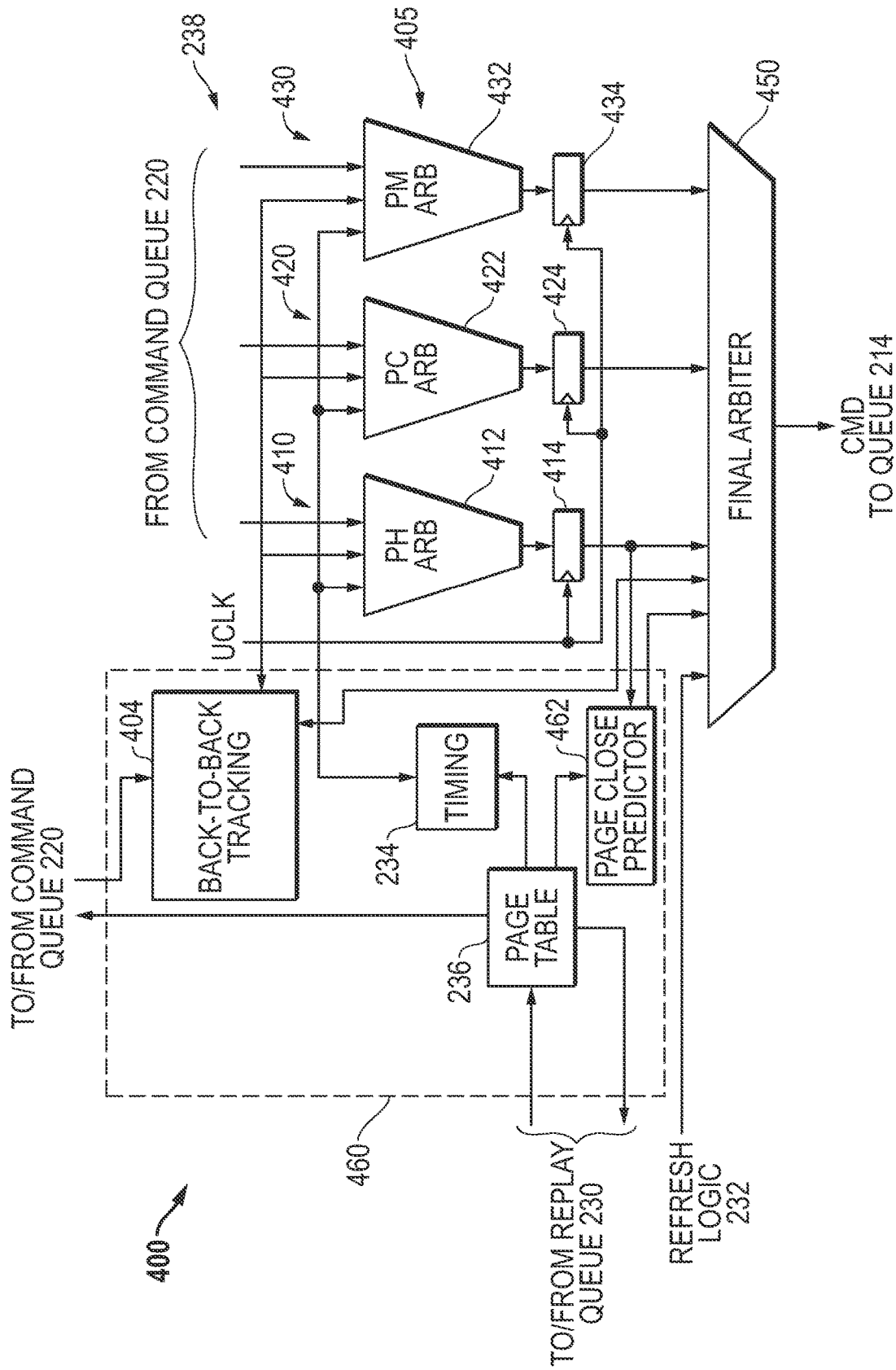
FIG. 4 illustrates a block diagram of a portion of the memory controller of FIG. 2 including an arbiter and related circuits according to some embodiments.

FIG. 4 illustrates a block diagram of a portion 400 of memory controller 200 of FIG. 2 including arbiter 238 and related circuits according to some embodiments. The depicted portion 400 is suitable for use in a memory controller for DDR5, GDDR5, GDDR6, and other similar DRAM types such as High Bandwidth Memory (HBM) of various generations such as HBM2, HBM3, and HBM4. Portion 400 includes arbiter 238 and a set of control circuits 460 associated with the operation of arbiter 238.

Arbiter 238 includes a set of sub-arbiters 405 and a final arbiter 450. Sub-arbiters 405 include a sub-arbiter 410, a sub-arbiter 420, and a sub-arbiter 430. Sub-arbiter 410 includes a page hit arbiter 412 labeled "PH ARB", and an output register 414. Page hit arbiter 412 has a first input connected to command queue 220, a second input connected to bank group tracking circuit 235, a third input connected to timing block 234, and an output. Register 414 has a data input connected to the output of page hit arbiter 412, a clock input for receiving the UCLK signal, and an output. Sub-arbiter 420 includes a page conflict arbiter 422 labeled "PC ARB", and an output register 424. Page conflict arbiter 422 has a first input connected to command queue 220, a second input connected to bank group tracking circuit 235, a third input connected to timing block 234, and an output. Register 424 has a data input connected to the output of page conflict arbiter 422, a clock input for receiving the UCLK signal, and an output. Sub-arbiter 430 includes a page miss arbiter 432 labeled "PM ARB", and an output register 434. Page miss arbiter 432 has a first input connected to command queue 220, a second input connected to bank group tracking circuit 235, a third input connected to timing block 234, and an output. The inputs to each of page hit arbiter 412, page conflict arbiter 422, and page miss arbiter 432 from command queue 220 include only a single command input from each entry stack 304, rather than every entry in command queue 220.

Register 434 has a data input connected to the output of page miss arbiter 432, a clock input for receiving the UCLK signal, and an output. Final arbiter 450 has a first input connected to the output of refresh control logic 232, a second input from a page close predictor 462, a third input connected to the output of output register 414, a fourth input connected to the output of output register 424, a fifth input connected to the output of output register 434, a first output for providing a first arbitration winner to queue 214 labeled "CMD1", and a second output for providing a second arbitration winner to queue 214 labeled "CMD2".

Control circuits 460 include timing block 234 and page table 236 as previously described with respect to FIG. 2, a page close predictor 462, and a back-to-back tracking circuit 402. Timing block 234 has an input connected to page table 236, and an input and an output connected to page hit arbiter 412, page conflict arbiter 422, and page miss arbiter 432. Page table 236 has an input connected to an output of replay queue 230, an output connected to an input of replay queue 230, an output connected to the input of command queue 220, an output connected to the input of timing block 234, and an output connected to the input of page close predictor 462. Page close predictor 462 has an input connected to one output of page table 236, an input connected to the output of output register 414, and an output connected to the second input of final arbiter 450. Back-to-back tracking circuit 402 has an input connected to command queue 220, an input and output connected to page hit arbiter 412, page conflict arbiter 422, and page miss arbiter 432, and an input and output connected to final arbiter 450.

Each of page hit arbiter 412, page conflict arbiter 422, and page miss arbiter 432 has an input connected to the output of timing block 234 to determine timing eligibility of commands in command queue 220 that fall into these respective categories. Timing block 234 includes an array of binary counters that count durations related to the particular operations for each bank in each rank.

A page hit is a read or write cycle to an open page. Page hit arbiter 412 arbitrates between accesses in command queue 220 to open pages. The timing eligibility parameters tracked by timers in timing block 234 and checked by page hit arbiter 412 include, for example, row address strobe (RAS) to column address strobe (CAS) delay time (tRcD) and CAS latency (tcL). Page hit arbiter 412 selects a sub-arbitration winner based on the assigned priority of the accesses.

A page conflict is an access to one row in a bank when another row in the bank is currently activated. Page conflict arbiter 422 arbitrates between accesses in command queue 220 to pages that conflict with the page that is currently open in the corresponding bank and rank. Page conflict arbiter 422 selects a sub-arbitration winner that causes the issuance of a precharge command.

A page miss is an access to a bank that is in the precharged state. Page miss arbiter 432 arbitrates between accesses in command queue 220 to precharged memory banks. The timing eligibility parameters tracked by timers in timing block 234 and checked by page miss arbiter 432 include, for example, precharge command period ($t_{RP}$). If there are two or more requests that are page misses at the same priority level, then the oldest entry wins.

Each sub-arbiter outputs a priority value for their respective sub-arbitration winner. Final arbiter 450 compares the priority values of the sub-arbitration winners from each of page hit arbiter 412, page conflict arbiter 422, and page miss arbiter 432. Final arbiter 450 determines the relative priority among the sub-arbitration winners by performing a set of relative priority comparisons taking into account two sub-arbitration winners at a time. The sub-arbiters may include a set of logic for arbitrating commands for each mode, read and write, so that when the current mode changes, a set of available candidate commands are quickly available as sub-arbitration winners. In some cases, page close predictor 462 causes the page to close at the end of the access indicated by page hit arbiter 412 by setting the auto pre-charge attribute.

Within page hit arbiter 412, the priority is initially set by the request priority from the memory accessing agent, but the priority is adjusted dynamically based on the type of accesses (read or write) and the sequence of accesses. In general, page hit arbiter 412 assigns a higher implicit priority to reads, but implements a priority elevation mechanism to ensure that writes make progress toward completion.

In other embodiments, arbiter 238 could include a different number of sub-arbiters. In yet other embodiments, arbiter 238 could include two or more sub-arbiters of a particular type. For example, arbiter 238 could include two or more page hit arbiters, two or more page conflict arbiters, and/or two or more page miss arbiters.

In operation, arbiter 238 selects memory access commands that are at the entry head designated by entry head indicator 309 of the entry stacks of command queue 220 by taking into account one or more of the common parameter indicators 308 for the entry stack 304. Preferably, arbiter 238 considers the row and bank, the page status of each entry, the priority of each memory access request, and the dependencies between requests. The priority is related to the quality of service or QoS of requests received from the AXI4 bus and stored in command queue 220, but can be altered based on the type of memory access and the dynamic operation of arbiter 238. Arbiter 238 includes three sub-arbiters that operate in parallel to address the mismatch between the processing and transmission limits of existing integrated circuit technology. The winners of the respective sub-arbitrations are presented to final arbiter 450. In some embodiments, each winner is tagged to indicate whether it has a currently tracked bank number but was nevertheless selected because no other suitable write commands were available. Final arbiter 450 selects between these three sub-arbitration winners as well as a refresh operation from refresh control logic 232, and may further modify a read or write command into a read or write with auto-precharge command as determined by page close predictor 462.

Back-to-back tracking circuit 402 receives the validity indicator of both the current entry and a subsequent entry to the current entry from each of the entry stacks 304. When a command is selected from an entry stack 304, back-to-back tracking circuit 402 allows the arbiter to, responsive to determining that the subsequent entry's validity indicator shows it is valid and a subsequent command should be selected in arbitration from the selected entry stack, select the subsequent entry from the selected entry stack for transmission without waiting for it to become the current entry. This operation is preferably accomplished by updating an internal entry in arbiter 238 for the entry head indicator, allowing arbiter 238 to make the subsequent selection without waiting the additional time for arbiter 238 to signal back to command queue 220 that the selection has been made, waiting for command queue 220 to update entry head indicator 309 to indicate a new entry head, and receiving that entry head. Such a process is further described below with respect to FIG. 8.

Figure 5:
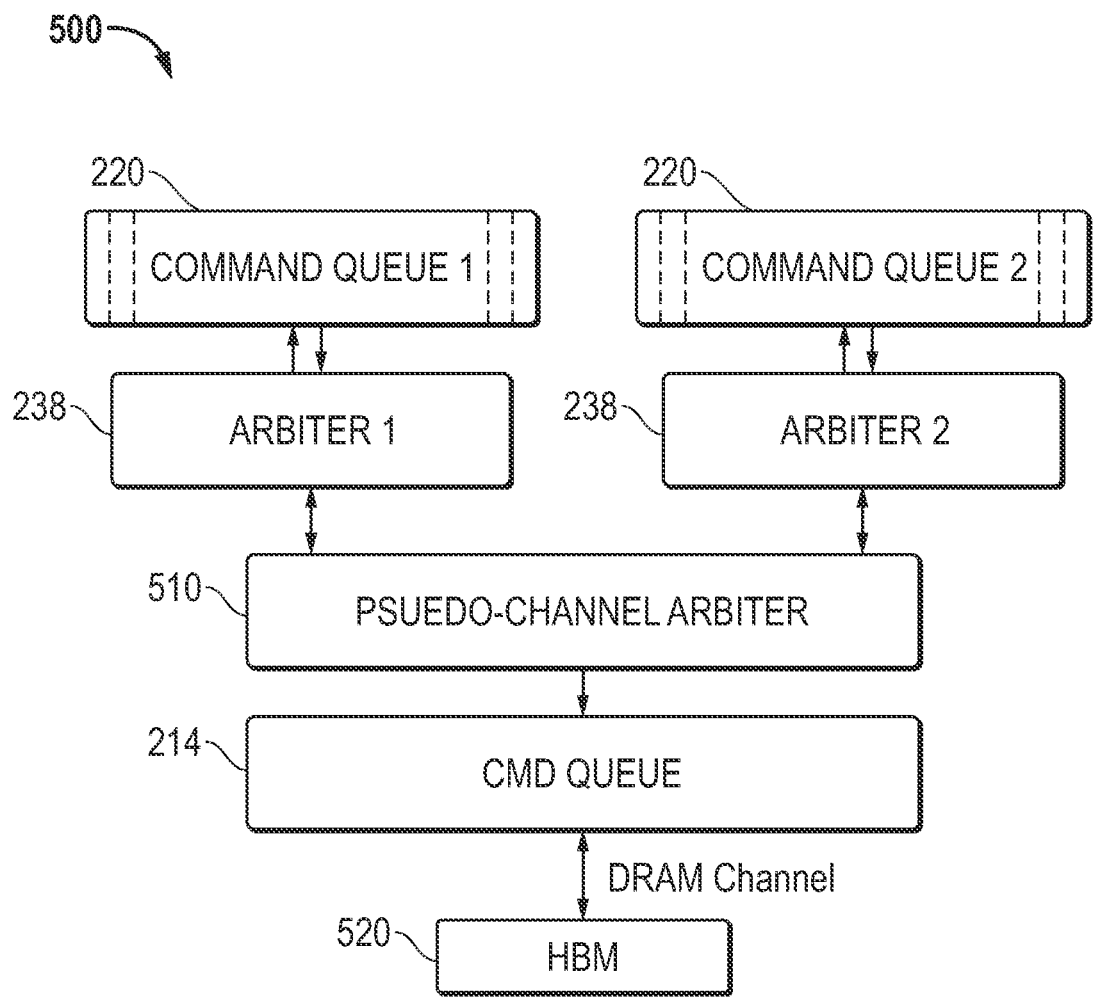
FIG. 5 shows in block diagram form a portion of a memory controller for interfacing with a high bandwidth memory (HBM) module according to some additional embodiments.

FIG. 5 shows in block diagram form a portion 500 of a memory controller for interfacing with a high bandwidth memory (HBM) module 520 according some additional embodiments. The depicted portion 500 includes first and second command queues 220, labelled "COMMAND QUEUE 1" and "COMMAND QUEUE 2", each connected to respective arbiter 238. Each arbiter 238 selects commands for a different pseudo-channel employed in communication with an HBM module 520. The output of each arbiter 238 is connected to a pseudo-channel arbiter 510 which makes a final selection among the candidates selected by the two arbiters 238. The final selection is then communicated over the DRAM channel to an HBM module.

The type of computing loads for which HBM memory is often employed make the stacked command queue techniques described herein especially beneficial for use with HBM memory modules. HBM DRAM is often used in graphics, high-performance computing, and server applications, many of which tend to have a high level of sequential memory accesses. Typically, an HBM module such as HBM module 520 includes multiple stacked DRAM devices which include multiple channels. An important feature of the updated HBM standard known as HBM2 is its Pseudo Channel mode, which divides a channel into two individual sub-channels of 64 bits. Pseudo channels operate at the same clock-rate, and share a row and column command bus. However, the pseudo channels are allocated separated memory banks in the DRAM, and commands to the pseudo channels are decoded and executed separately. Generally the pseudo-channels improve scheduling of memory accesses and lower memory access latency, which results in higher effective bandwidth.

While a single channel with two pseudo-channels is depicted in FIG. 5, typically an HBM module will support multiple channels, with each channel able to operate in Pseudo Channel mode with two pseudo-channels. As such, a the depicted memory controller portion 500 may be repeated for each channel supported by HBM module 520. Generally, the memory controller supports a separate data fabric interface for each pseudo channel supported.

Figure 6:
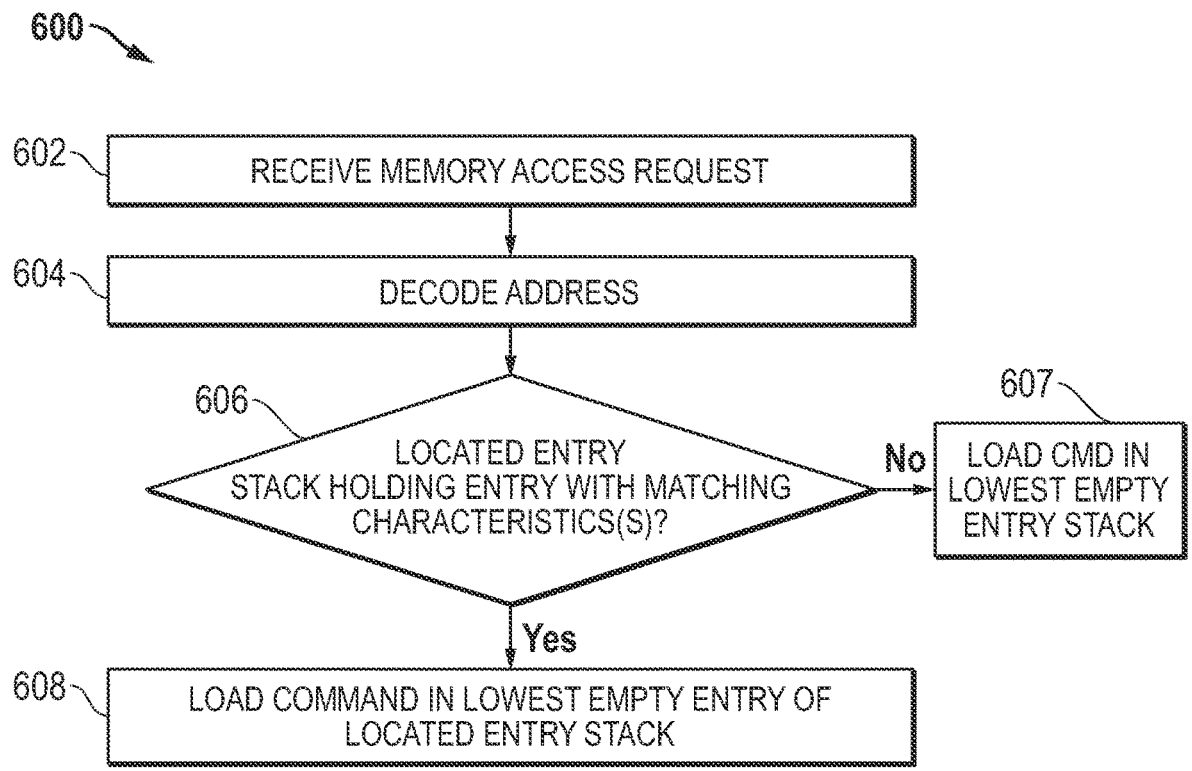
FIG. 6 shows a flowchart of a process for loading commands to a stacked command queue according to an exemplary embodiment.

FIG. 6 shows a flowchart 600 of a process for loading commands to a stacked command queue according to an exemplary embodiment. The process is suitable for use with a stacked command queue such as command queue 220 (FIG. 2), and is performed by a command queue loader circuit such as command queue loader 302. The process is performed for each new memory access request received for loading in command queue 220. At block 602, the process receives a new memory access request. The request is decoded at block 604 to produce a memory access command including decoding the address as described above.

At block 606, the command queue loader circuit receives the decoded and determines if it can locate an existing entry stack 304 in command queue 220 having the same values of a determined characteristic, typically the bank and row. If the incoming command has a bank number and row address that match an entry stack with available room, the process at block 608 loads the command into that entry behind the existing request. For example, if an entry Col0 is already occupied in an entry stack, then the incoming request will be stored into the entry Col1. The valid bit for the newly occupied entry is also set to 1 to indicate the entry holds a valid command. If there is no entry stack located with a matching characteristic at block 606, or the entry stacks with matching characteristics are full, the process goes to block 607 where it loads the command into the lowest empty entry stack.

Figure 7:
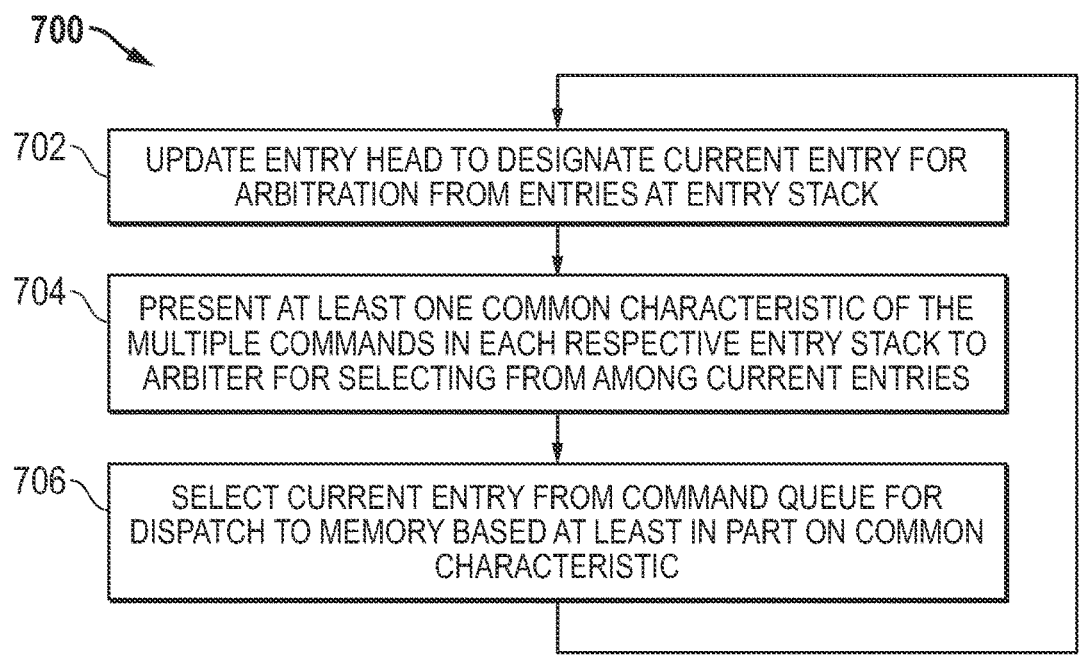
FIG. 7 shows a flowchart of a process for dispatching commands according to some embodiments.

FIG. 7 shows a flowchart 700 of a process for dispatching commands according to some embodiments. The depicted process is suitable for use with a stacked command queue and arbiter such as stacked command queue 220 and arbiter 238 (FIG. 2). At block 702, each time a command is selected for dispatch from an entry stack, the entry head indicator for that entry stack is updated to indicate a new current entry from the entries held at the entry stack. This current entry is presented to the arbiter as a candidate for selection. At block 704, the stacked command queue presents at least one common characteristic of the multiple commands in each respective entry stack to the arbiter for use in selecting from among the current entries of the command queue. As discussed above, with the stacked command queue 220 of FIG. 3, the common characteristics are provided by parameter indicators 308, which are provided to the arbiter along with the current entry through a single command input for each entry stack.

At block 706, the process selects a current entry from the stacked command queue for dispatch. This selection is based at least in part on the common characteristics presented to the arbiter from the stacked command queue. The arbiter makes the selection and causes the command to be dispatched. As the command is selected for dispatch at block 706, the process then returns to block 702 where it removes the dispatched command and update the entry head indicator. In some embodiments, the arbiter includes a back-to-back tracking circuit like circuit 402 (FIG. 4) which is able to speed the selection for certain bursts of commands by tracking the entry head indicators 309 and validity indicators 307 (FIG. 3) as further described with respect to FIG. 8 below.

Figure 8:
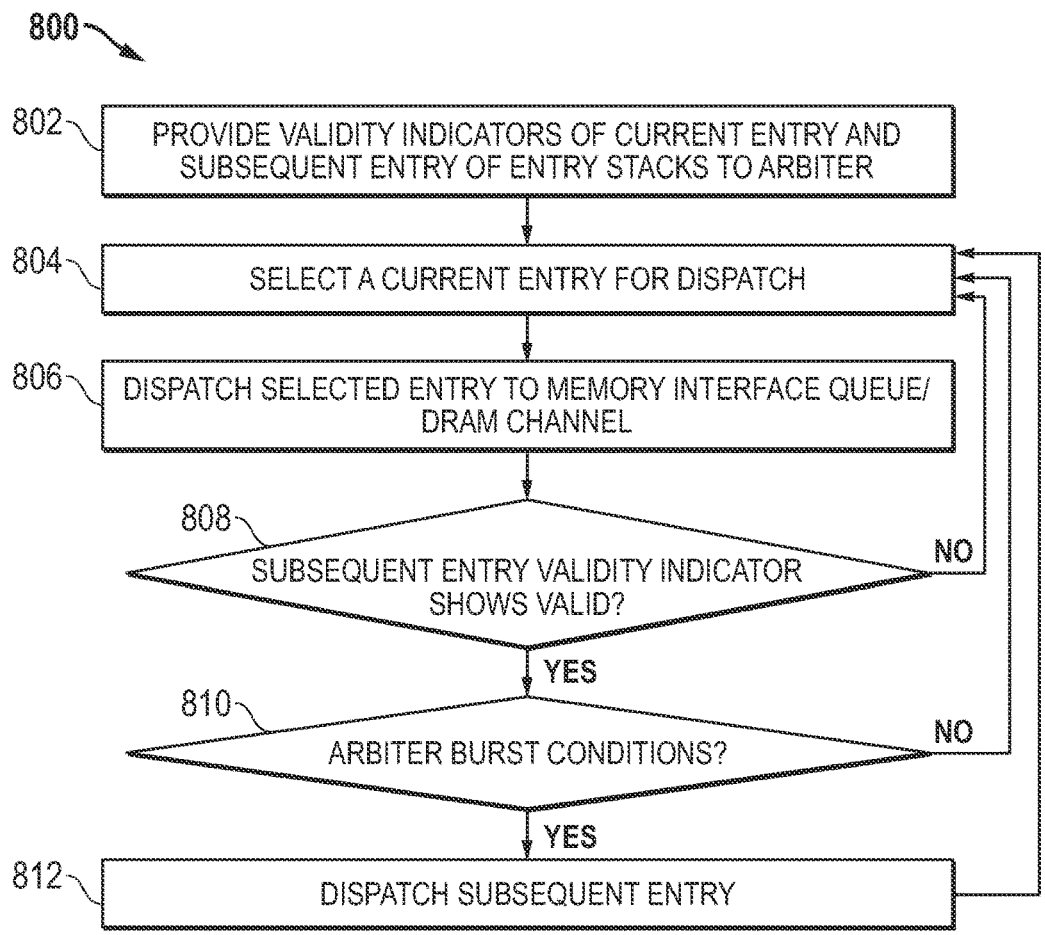
FIG. 8 shows a flowchart of an additional process for dispatching commands according to some embodiments.

FIG. 8 shows a flowchart 800 of an additional process for dispatching commands according to some embodiments. The depicted process is suitable for use with a stacked command queue such as that of FIG. 3. The process starts at block 802 where the command queue provides validity indicators for the current entries from the entry stacks of the command queues to the arbiter. At block 804, the arbiter selects a current entry command from the command queue for dispatch as described above. The selected command is dispatched to the DRAM channel at block 806, typically by sending the command to a memory interface queue from which it is transmitted on the DRAM channel.

At block 808, the process determines whether the subsequent entry's validity indicator shows it is valid. This determination is preferably made by the arbiter's back-to-back tracking circuit checking the validity indicator received from the stacked command queue. If the validity indicator shows that the subsequent entry in the entry stack is not valid, the process at block 808 returns to block 804 to select a new command for dispatch according to the arbiter's regular operation. If the subsequent entry's validity indicator is valid, the process has the opportunity to perform a command burst with accelerated speed. Bursts, or page hit bursts, are sequential groups of commands of the same type to the same page.

At block 810, the process determines if the arbiter has conditions that allow a command burst to start or continue. This determination may include checking whether a current burst duration is overly long or a current burst can continue, and checking whether other priority commands are waiting for dispatch that might prevent starting or continuing a burst. While flowchart 800 shows blocks 806, 808, and 810 as sequential, in most implementations the arbiter's digital logic implementing these decisions operates simultaneously in parallel. If at block 810 the process determines that a burst should not start or continue, the process returns to block 804. If at block 810 the process determines that a burst can start or continue, the process goes to block 812 where it selects and dispatches the subsequent entry in the entry stack from which the last selected command was dispatched without waiting for it to become the current entry. In the embodiment of FIG. 4, this operation is preferably accomplished by updating an internal entry in arbiter 238 for the entry head indicator, allowing arbiter 238 to make the subsequent selection without waiting the additional time for arbiter 238 to signal back to command queue 220 that the selection has been made, waiting for command queue 220 to update entry head indicator 309 to indicate a new entry head, and receiving that entry head.

The depicted process accelerates the selection and dispatch of commands from the same entry stack. For example, in a two-stage arbiter such as arbiter 238 of FIG. 4, the arbiter would have to wait two additional clock cycles to dispatch the subsequent entry without using back-to-back tracking circuit 402 to accelerate the process.

Figure 9:
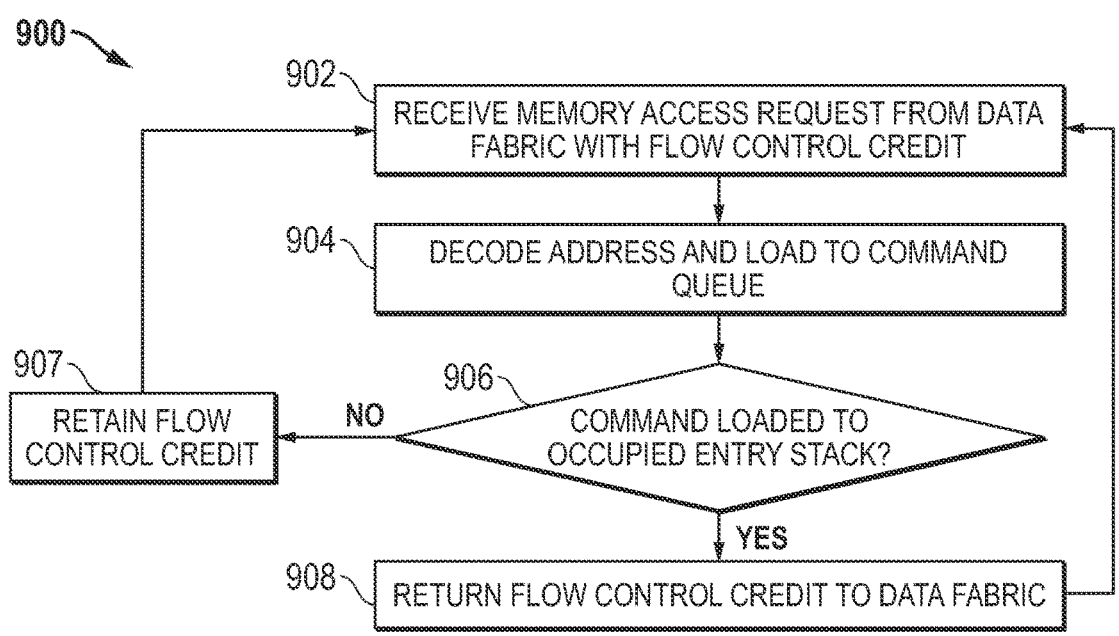
FIG. 9 shows a flowchart of a process for handling flow control credits according to some embodiments.

FIG. 9 shows a flow diagram 900 of a process for handling flow control credits according to some embodiments. The depicted process is suitable for use with a memory controller having a stacked command queue, such as memory controller 200 of FIG. 2. The process is performed by a credit control circuit such as credit control circuit 270.

At block 902, the process receives a memory access request including a flow control credit at the memory controller, for example through interface 212 in FIG. 2. The request is typically from a memory agent of a data fabric. The flow control credit is for preventing overflow of the command queue. Without a stacked command queue, such credits are typically received with each command, and a credit is released back to the data fabric each time a command is retired from the command queue. However, with a stacked command queue, the queue has a larger capacity than the queue width, and therefore can benefit from the improved credit control as performed by the depicted process.

The received memory access request is decoded and loaded to the command queue at block 904. At block 906, the process determines whether the command was loaded to an entry stack that was already occupied, or to an entry stack that was previously empty. If the command was loaded to an entry stack that was already occupied by at least one command, the process goes to block 908 where it returns the flow control credit to the data fabric. If, at block 906, the process determines that the command was loaded to an unoccupied entry stack, the process goes to block 907 where it retains the flow control credit. The depicted process has the advantage of keeping the stacked command queue more fully occupied, thereby improving efficiency of flow control.

The circuits of FIG. 2, FIG. 3, FIG. 4, and FIG. 5 or any portions thereof, such as arbiter 238 and command queue 220 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory controller 200 may vary in different embodiments. Memory controller 200 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A memory controller, comprising:
a command queue loader circuit for receiving incoming memory access commands and loading entries of a plurality of entry stacks;
a command queue including said plurality of entry stacks, each entry stack including: a plurality of entries each for holding memory access commands, one or more parameter indicators each a variable and holding a respective characteristic common to the plurality of entries, and a head indicator designating a current entry for arbitration, wherein the command queue loader circuit is operative to load a selected new incoming command into a selected empty entry stack and updates the one or more parameter indicators of the selected empty entry stack to match the at least one common characteristic of the selected new incoming command;
a first arbiter for selecting memory access commands from the command queue for transmission to a memory coupled to a memory channel, the first arbiter including a single command input for each entry stack; and
a credit control circuit for handling flow control credits for a data fabric from which memory access commands are received as memory access requests and decoded before being loaded into the command queue, the credit control circuit operable to retain a credit responsive to a respective memory access command being loaded into a previously empty entry stack, and return a credit to the data fabric responsive to the respective memory access command being loaded into an entry stack already holding at least one memory access command.

2. The memory controller of claim 1, further comprising a command queue control circuit that, responsive to a memory access command being selected by the first arbiter, updates the head indicator to indicate a new current entry for arbitration at an entry stack from which said memory access command was selected.

3. The memory controller of claim 1, wherein the one or more parameter indicators for each entry stack include a row indicator and a bank indicator, and wherein the first arbiter employs the row indicator and bank indicator in selecting memory access commands.

4. The memory controller of claim 3, wherein the one or more parameter indicators for each entry stack further include a page status indicator for indicating to the first arbiter whether the entry stack contains page miss commands, page hit commands, or page conflict commands.

5. The memory controller of claim 1, wherein the first arbiter further selects memory access commands from the command queue for transmission to a DRAM memory coupled to a DRAM channel.

6. The memory controller of claim 1, wherein:
the entries each include a validity indicator for indicating whether the entry currently holds a valid memory access command;
the first arbiter receives the validity indicator of both the current entry and a subsequent entry to the current entry from each of the entry stacks; and
the first arbiter, responsive to selecting the current entry from a selected one of the entry stacks for transmission, and responsive determining that the subsequent entry's validity indicator shows it is valid and a subsequent command should be selected in arbitration from the selected entry stack, selects the subsequent entry from the selected entry stack for transmission without waiting for it to become the current entry.

7. The memory controller of claim 1, wherein the command queue loader circuit, responsive to receiving a new command with a characteristic matching that of a parameter indicator of an existing occupied one of the entry stacks with available space, loads the new command to the existing occupied one of the entry stacks, and responsive to the new command not having a characteristic matching that of a parameter indicator of any existing occupied entry stack with available space, loads the new command in an empty one of the entry stacks.

8. The memory controller of claim 1, wherein the command queue, the first arbiter, and the command queue loader circuit are all associated with a first pseudo-channel of a high bandwidth memory (HBM) module coupled to the memory channel, and further comprising:
a second command queue including a plurality of entry stacks, each entry stack including: a plurality of entries each for holding memory access commands, one or more parameter indicators each a variable holding a respective characteristic common to the plurality of entries, and a head indicator designating a current entry for arbitration;
a second arbiter for selecting memory access commands from the second command queue for transmission to a second pseudo-channel of the HBM module, the second arbiter including a single command input for each entry stack;
a second command queue loader circuit for receiving incoming memory access commands and loading entries of respective entry stacks with memory access commands having the respective characteristic of each of the one or more parameter indicators in common; and
a final arbiter stage for selecting between candidate commands provided by the first arbiter and the second arbiter.

9. A data processing system, comprising:
a plurality of graphics processing units;

a data fabric coupled to the plurality of graphics processing units; and a memory controller coupled to the data fabric for fulfilling memory access requests from the graphics processing units, the memory controller comprising:

a command queue including a plurality of entry stacks, each entry stack including: a plurality of entries each for holding memory access commands, one or more parameter indicators each a variable and holding a respective characteristic common to the plurality of entries, and a head indicator designating a current entry for arbitration;

a first arbiter for selecting memory access commands from the command queue for transmission to a DRAM memory coupled to a DRAM channel, the first arbiter including a single command input for each entry stack; and a command queue loader circuit for receiving incoming memory access commands and loading entries of respective entry stacks with memory access commands having the respective characteristic of each of the one or more parameter indicators in common, wherein the command queue loader circuit is operable to load a selected new incoming command into a selected empty entry stack and updates the one or more parameter indicators of the selected empty entry stack to match of the at least one common characteristic of the selected new incoming command; and a credit control circuit for handling flow control credits for the data fabric from which memory access commands are received as memory access requests and decoded before being loaded into the command queue, the credit control circuit operable to retain a credit responsive to a respective memory access command being loaded into a previously empty entry stack, and return a credit to the data fabric responsive to the respective memory access command being loaded into an entry stack already holding at least one memory access command.

10. The data processing system of claim 9, further comprising a command queue control circuit that, responsive to a memory access command being selected by the first arbiter, updates the head indicator to indicate a new current entry for arbitration at an entry stack from which said memory access command was selected.

11. The data processing system of claim 9, wherein the one or more parameter indicators for each entry stack include a row indicator and a bank indicator, and wherein the first arbiter employs the row indicator and bank indicator in selecting memory access commands.

12. The data processing system of claim 11, wherein the one or more parameter indicators for each entry stack further include a page status indicator for indicating to the first arbiter whether the entry stack contains page miss commands, page hit commands, or page conflict commands.

13. The memory controller of claim 9, wherein the entries each include a validity indicator for indicating whether the entry currently holds a valid memory access command.

14. The data processing system of claim 13, wherein:
the first arbiter receives the validity indicator of both the current entry and a subsequent entry to the current entry from each of the entry stacks; and
the first arbiter, responsive to selecting a current entry from a selected one of the entry stacks for transmission, and responsive determining that the subsequent entry's validity indicator shows it is valid and a subsequent command should be selected in arbitration from the selected entry stack, selects the subsequent entry from the selected entry stack for transmission without waiting for it to become the current entry.

15. The data processing system of claim 9, wherein the command queue, the first arbiter, and the command queue loader circuit are all associated with a first pseudo-channel of a high bandwidth memory (HBM) module coupled to the DRAM channel, and further comprising:

a second command queue including a plurality of entry stacks, each entry stack including: a plurality of entries each for holding memory access commands, one or more parameter indicators each holding a respective characteristic common to the plurality of entries, and a head indicator designating a current entry for arbitration;

a second arbiter for selecting memory access commands from the second command queue for transmission to a second pseudo-channel of the HBM module, the second arbiter including a single command input for each entry stack;

a second command queue loader circuit for receiving incoming memory access commands and loading entries of respective entry stacks with memory access commands having the respective characteristic of each of the one or more parameter indicators in common; and a final arbiter stage for selecting between candidate commands provided by the first arbiter and the second arbiter.

16. The data processing system of claim 9, wherein the command queue loader circuit, responsive to receiving a new command with a characteristic matching that of a parameter indicator of an existing occupied one of the entry stacks with available space, loads the new command to the existing occupied one of the entry stacks, and responsive to the new command not having a characteristic matching that of a parameter indicator of any existing occupied entry stack with available space, loads the new command in an empty one of the entry stacks.

17. A method of operating a memory controller, comprising:
loading multiple memory access commands into each of multiple entry stacks in a command queue;
for each respective entry stack, designating a current entry for arbitration from among the multiple memory access commands in the respective entry stack;
for each respective entry stack, presenting an indicator holding a variable value of at least one common characteristic of the multiple memory access commands in the respective entry stack to an arbiter for selecting from among the current entries; and
loading a selected new incoming command into a selected empty entry stack and updating the indicator of the selected empty entry stack to match the at least one common characteristic of the selected new incoming command;
at the arbiter, selecting a current entry from the command queue for dispatch to a memory based at least in part on the at least one common characteristic; and
at a credit control circuit, handling flow control credits for a data fabric from which memory access commands are received as memory access requests and decoded before being loaded into the command queue, the handling including retaining a credit responsive to a respective memory access command being loaded into a previously empty entry stack, and returning a credit to the data fabric responsive to the respective memory access command being loaded into an entry stack already holding at least one memory access command.

18. The method of claim 17, wherein loading the multiple memory access commands includes loading a plurality of the memory access commands with a common row address into one of the entry stacks.

19. The method of claim 17, further comprising, responsive to a memory access command being selected by the arbiter, designating a new current entry for an entry stack from which said memory access command was selected.

20. The method of claim 17, wherein the least one common characteristic include a row address and a bank number, and wherein the arbiter employs the row address and bank number in selecting memory access commands.

21. The method of claim 17, wherein the entries each include a validity indicator for indicating whether the entry currently holds a valid memory access command.

* * * * *